United States Patent [19]

Large

[11] Patent Number: 4,616,426
[45] Date of Patent: Oct. 14, 1986

[54] VALVE FOR THE PNEUMATIC DISTRIBUTION OF FLUIDIZABLE MATERIAL

[75] Inventor: Jean F. Large, Compiegne, France

[73] Assignee: Charbonnages de France, Paris, France

[21] Appl. No.: 751,239

[22] Filed: Jul. 2, 1985

[30] Foreign Application Priority Data

Jul. 4, 1984 [FR] France ................. 84 10616

[51] Int. Cl.⁴ ............................................. F26B 17/10
[52] U.S. Cl. ................................. 34/57 A; 34/57 R; 34/52; 34/56; 34/217; 432/58
[58] Field of Search ................. 34/10, 57 A, 210, 214, 34/215, 52, 56, 217; 432/58

[56] References Cited

U.S. PATENT DOCUMENTS

| 1,766,030 | 6/1930 | Meakin | 34/57 A |
| 3,685,165 | 8/1972 | Devé | 34/57 A |
| 4,399,618 | 8/1983 | Rydstad | 34/57 A |

FOREIGN PATENT DOCUMENTS 57-145729 9/1982 Japan .

Primary Examiner—Larry I. Schwartz
Attorney, Agent, or Firm—Cushman, Darby & Cushman

[57] ABSTRACT

A valve for the pneumatic distribution of fluidizable material comprising a main compartment with a fluidization grid and with an overflow pipe supplied with fluidizable material via a pipeline. The main compartment is put into communication by means of a passage with several auxiliary compartments with a fluidization grid and with an overflow pipe, the fluidized material leaving via any one of the overflow pipes, as desired.

9 Claims, 2 Drawing Figures

VALVE FOR THE PNEUMATIC DISTRIBUTION OF FLUIDIZABLE MATERIAL

BACKGROUND TO THE INVENTION

The invention relates to a valve for the pneumatic distribution of fluidisable material and in particular to a valve for selectively guiding, in a specific direction selected from at least two different directions and in a controlled flow, a stream of fluidisable material which is delivered to the valve via a supply pipeline.

SUMMARY OF THE INVENTION

An object of the invention is to provide a valve which is designed particularly for receiving, via a supply pipeline, finely divided material which comes from a first processing apparatus in a continuous flow which is generally constant, but which can also be variable. A further object of the invention is to provide a valve which can receive intermittently quantities of fluidisable fragmented material which the valve can distribute in different directions.

The invention provides a valve for the selective distribution of fluidised material between at least two separate outlets, the valve being arranged to receive fluidisable material via a supply pipeline, the valve comprising a main compartment, a side wall and a bottom of the main compartment, a fluidising means which is located at the bottom of the main compartment and is capable of fluidising the said fluidisable material to an upper level, an overflow pipe which is provided in the side wall and is located at the upper level, at least one auxiliary compartment which is adjacent to the main compartment, the or each auxiliary compartment comprising a side wall, a bottom, a fluidising means which is located at the bottom of the respective auxilary compartment and is capable of fluidising the said fluidisable material to a respective specific level, and an overflow pipe which is provided in the side wall of the respective auxiliary compartment and is located at a level which is at most equal to the level of the overflow pipe of the main compartment, and at least one communication passage which is between the main compartment and the auxiliary compartment or each auxiliary compartment through their respective side walls and is positioned at an intermediate level between the level of the highest fluidising means of the main compartment and the respective auxiliary compartment and the level of the overflow pipe of the respective auxiliary compartment.

The main compartment is preferably elongate in the vertical direction when the valve is in operation and the fluidising means is capable of putting in the fluidised state a quantity of fluidisable material which can occupy a volume reaching a level, called the upper level, in the vertical direction. The supply pipeline for fluidisable material exits within the main compartment, and the overflow pipe projects externally from the side wall so as to guide the material in a first direction from the valve. At least one communication passage is made in the side wall between the level of the fluidising means and the level of the overflow pipe. Furthermore, at least one second auxiliary compartment is provided next to the main compartment. The auxiliary compartment has a side wall and a bottom incorporating a fluidising means. A communication passage is made in this side wall and is connected to the communication passage of the main compartment. The fluidising means of the auxiliary compartment is capable of fluidising fluidisable material coming from the main compartment. The resultant fluidised material occupies a volume reaching a specific level, and the side wall is provided at this specific level with an overflow pipe for guiding the material in a second direction from the valve. In practice, that overflow pipe is located between the level of the communication passage between the compartments and the level of the overflow pipe of the main compartment.

In use, the overflow pipes are preferably inclined downwardly from the side wall, so that the fluidised material reaching them falls under the action of gravity.

In general, the fluidising means of all the compartments are arranged in a common horizontal plane, and the communication passages between the main compartment and the auxiliary compartments are located at a common intermediate level between that of the fluidising means and that of the overflow pipe of the main compartment.

However, that particular relative arrangement is not absolutely essential. It is possible for the fluidising means of the auxiliary compartment or compartments or of some of the auxiliary compartments to be located at a different level from that of the fluidising means of the main compartment.

Preferably, the pipe supplying fluidisable material into the main compartment penetrates into the main compartment through its top, descends within this compartment, then stops and in operation discharges via an exit orifice which is located at a level which is higher than that of the fluidising means. Advantageously, the lower end part of the supply pipe is constantly submerged in the volume of fluidisable material, thus ensuring pneumatic isolation between the first processing apparatus, from which the fluidisable material comes, and the secondary apparatuses, to which the fluidised material is fed when it leaves the valve from the compartment or compartments.

If that effect of pneumatic isolation is not intended, there is no need for the supply pipe to descend from the top of the main compartment downwardly into the main compartment. The fluidisable material can be conveyed to the main compartment and introduced into the main compartment by any suitable means. The supply pipe for the fluidisable material preferably opens into the main compartment below the level of the communication passage, when it is desired to promote the mixing of the solids in the main compartment.

DESCRIPTION OF THE PREFERRED EMBODIMENTS

Figure 1:
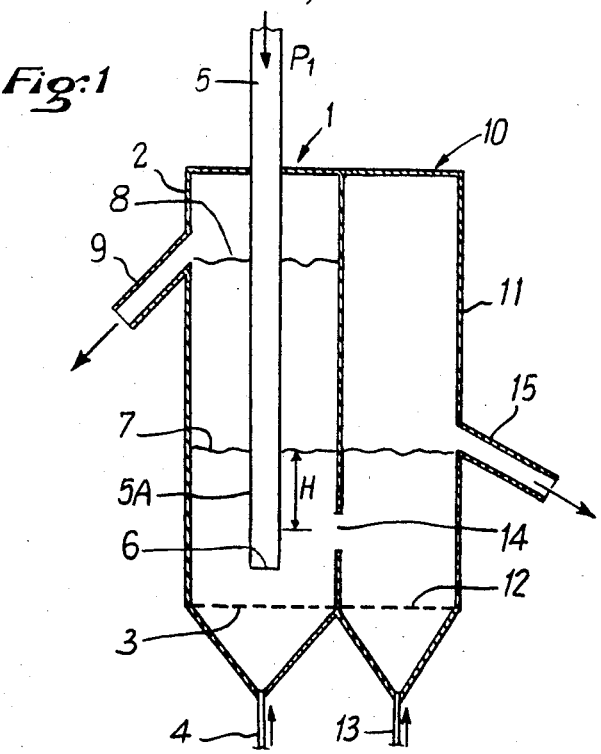
FIG. 1 is a general diagrammatic sectional view of a valve according to a first embodiment of the invention.

Referring to FIG. 1, a valve includes a main compartment 1 which is elongate in the vertical direction and which is preferably a central compartment having a side wall 2 and a bottom 3. The bottom 3 consists of a fluidisation grid, through which passes fluidising gas which is delivered to the fluidisation grid via a fluidising-gas tube 4. However, any other fluidising means, for example a bundle of perforated tubes for the outlet of the fluidising gas, could be used instead of a fluidisation grid.

A supply pipline 5 enters the main compartment 1, descends within the main compartment 1 and terminates in an exit orifice 6 which is positioned above the bottom 3. Material in the form of particles suitable for being fluidised enters the main compartment 1 via the pipeline 5. In use, the lower end part 5A of the supply pipeline 5 is submerged in the quantity of fluidisable material up to a level below the level 7. In the fluidised state, the material occupies a volume reaching an upper level 8. At upper level 8, an overflow pipe 9 projects from the side wall 2 and is inclined obliquely downwardly to form a first valve outlet.

At least one auxiliary compartment 10 is provided next to the main compartment 1. The auxiliary compartment 10 is preferably joined to the main compartment 1 by side wall 2 and a side wall 11 for the auxiliary compartment 10. The auxiliary compartment 10 is also elongate in the vertical direction and has a bottom 12 consisting of a fluidisation grid, or an equivalent fluidisation means, which is fed with fluidising gas via a tube 13. A communication passage 14 between the main compartment 1 and the auxiliary compartment 10 is made in the joined side walls 2 and 11 at an intermediate level between the level of the overflow pipe 9 of the main compartment 1 and the level of the fluidisation grids 3 and 12 which, in the illustrated embodiment, are in a common horizontal plane. As is shown in FIG. 1, when the main and auxiliary compartments 1 and 10 are joined together by a common wall, the communication passage 14 is reduced to a common aperture. The main and auxiliary compartments 1 and 10 could alternatively be spaced from one another, in which case the passage 14 would comprise a sleeve connecting the two apertures made in the side walls 2 and 11. The distance between the sides walls 2 and 11 is preferably limited to a low value, for reasons which will become evident later.

An overflow pipe 15 forming a second valve outlet projects obliquely downwardly from the side wall 11 of the auxiliary compartment 10. The pipe 15 is located at any desired level between the level of the communication passage 14 and the level of the overflow pipe 9 of the main compartment 1. Of course, the highest level at which the pipe is located is that which can be reached by the fluidised material in the auxiliary compartment 10.

FIG. 1 shows only a single auxiliary compartment 10. If desired, there can be several auxiliary compartments 10 which are arranged round the main compartment 1, each auxiliary compartment 10 having a respective communication passage with the main compartment 1. The overflow pipes 15 of the auxiliary compartments 10 can be in a common horizontal plane, but this is not absolutely essential. In each auxiliary compartment 10, the respective overflow pipe 15 is placed above the level of the communication passage 14 of the respective auxiliary compartment, at any point up to the level of the overflow pipe 9 of the main compartment 1. The communication passages 14 are themselves preferably in a common horizontal plane, but in actual fact it is sufficient for each communication passage 14 to be at any level which is between that of the fluidising means 3, 12 and that of the overflow pipe 9 of the main compartment 1.

The valve of the invention operates in the following way.

When the main compartment 1 contains fluidisable material and when the fluidisable material is put in a fluidised state by the action of the fluidising-gas which is delivered through fluidisation grid 3 from fluidising-gas tube 4, the uppermost level of the fluidised material reaches the upper level 8 and meets the overflow pipe 9 through which the fluidised material flows out of the valve. If the material is arriving via the supply pipe from a first apparatus where there prevails a pressure $P_1$ which is higher than the pressure $P_2$ prevailing in a second apparatus where the overflow pipe 9 terminates, it is desirable that the supply pipe 5 be permanently submerged in the fluidisable material to a height H such that $P_1 - P_2 = d\ g\ H$, d being the density of the material in the fluidised state. Pneumatic isolation is thus achieved between the two apparatuses.

When there is no fluidisation occurring in the auxiliary compartment or compartments 10, the material only passes through the compartment 1, coming from the supply pipe 5 and flowing out of the compartment 1 via the overflow pipe 9. The auxiliary compartment or compartments 10 in this case contain unfluidised material which is relatively dense and so blocks the communication passage or passages 14. If necessary, baffles can be provided in the passage or passages 14 in order to prevent the fluidising gas of the main compartment 1 from penetrating into the auxiliary compartment or compartments 10. The spacing between the compartments, which has been already mentioned above, has an effect which is similar to that of the baffles.

When the fluidising means 12 of an auxiliary compartment 10 is put into operation, the material which is contained in the auxiliary compartment is fluidised and reaches the overflow pipe 15 of the auxiliary compartment 10, through which the fluidised material flows off. The fluidised material leaving the auxiliary compartment 10 is replaced by material coming from the main compartment 1. The level of fluidised material in the two compartments 1 and 10, when they are both in operation, is the level of the lowest overflow pipe 15. The material then flows off in the direction of the lowest overflow pipe 15.

When the overflow pipe or pipes 15 of the auxiliary compartments 10 are at the same level as the overflow pipe 9 of the main compartment, the valve can produce, as desired, equal or different flows of fluidisable material in different directions, without any mechanical means acting on the material, provided that a sufficient quantity of fluidisable material arrives via the supply pipe 5, and this can be achieved by, inter alia, the use of several supply pipes 5 ending in the main compartment 1.

The appropriate feeding of fluidised material to the auxiliary compartments 10 from the main compartment 1 through the communication passages 14 places a limit, which is easily determined by trials, on the spacing which can be provided between the compartments. The use of joined compartments which have a common wall between the auxiliary compartments and the main compartment is preferred.

There are usually several auxiliary compartments 10, so that by operating them selectively the material is guided selectively in any of the directions of their respective overflow pipes, without the use of any movable mechanical means in contact with the fluidised material.

The main compartment 1 can also be filled intermittently in separate batches via the supply pipe 5 or via several separate supply pipes. If appropriate, those batches are mixed homogeneously by fluidisation inside the main compartment 1 and are then conveyed either completely or in fractions in one or more directions, the appropriate auxiliary compartments being operated selectively.

In this way, the valve of the invention makes it possible to feed several receiving apparatuses in sequence with a material coming from a storage silo or a reactor, whilst at the same time ensuring the pneumatic isolation of the storage silo or reactor relative to the receiving apparatuses.

The valve of the invention is also used advantageously in a circuit for the circulation or recirculation of a fluidised material, periodically either to extract from or add to the fluidised material a specific volume of material.

Figure 2:
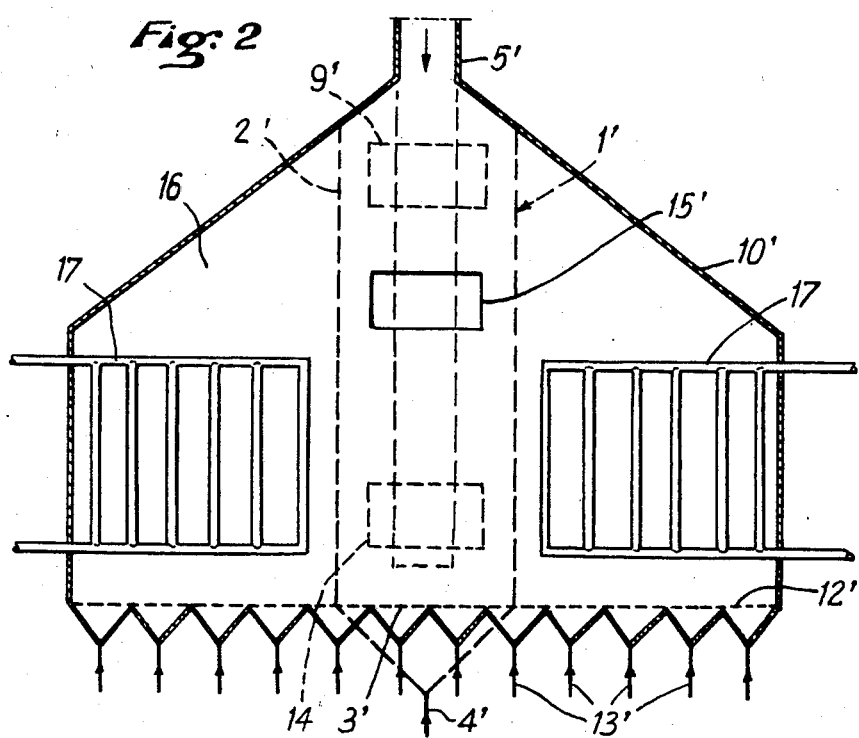
FIG. 2 is a general diagrammatic part-sectional view of a valve according to a second embodiment of the invention when used in combination with a fluidised-bed heat exchanger.

FIG. 2 illustrates an alternative embodiment, and to describe FIG. 2 the same reference numerals bearing the index mark ' are used.

The main compartment 1', shown by broken lines, is surrounded by an auxiliary compartment 10' which consequently has an annular working volume 16 round the main compartment 1'. The two compartments 1' and 10' have a frustoconical upper wall which ends where the upper wall meets the supply pipe 5', the assembly as a whole having a generally concentric arrangement. In their lower part, the two compartments 1' and 10' end in a common bottom consisting of a common fluidisation grid. The fluidisation grid consists of a central part 3', which is associated with the fluidising-gas tube 4' for the main compartment 1', and an annular surrounding part 12', which is associated with the fluidising-gas tubes 13' for the auxiliary compartment 10'.

In the side wall 2' of the central compartment there is provided a communication passage 14' which communicates the two compartments 1' and 10' and the inner end of the overflow pipe 9' which passes radially through the auxiliary compartment 10' and exits on the other side of the auxiliary compartment 10'. The auxiliary compartment 10' is provided with overflow pipe 15'.

The auxiliary compartment 10' has a much larger diameter than the main compartment 1'. The auxiliary compartment 10' contains within its annular volume 16 the bundles of tubes 17 of a heat exchanger. During operation, when material is fluidised within auxiliary compartment 10' the bundles 17 are completely submerged in the fluidised material because they are arranged below the level of the overflow pipe 15'.

When the main compartment 1' alone is in operation by supplying fluidising-gas through tube 4', the material only passes through the main compartment 1', leaving the main compartment 1' via the overflow pipe 9'. When the auxiliary compartment 10' is also put into operation by supplying fluidising-gas through tubes 13', the fluidised material enters the auxiliary compartment 10' via the communication passage 14' and leaves the auxiliary compartment 10' via the overflow pipe 15'. Heat exchange can take place between the fluidised material and fluid which can circulate within the bundles of tubes 17. The fluidisation grid 13' is preferably of a known type with modulated operation, thus making it possible to regulate the degree of heat exchange which occurs.

The supply pipe 5' descends within the main compartment 1' in order to ensure the pneumatic isolation which is described above with reference to FIG. 1. In this second embodiment of the invention, if desired the concentric arrangement of the compartments can be replaced by another appropriate arrangement and the bundles 17 can be formed according to any desired configuration.

If desired, the compartments can be completely closed at the top except for the entrance of the supply pipe 5 for the fluidised material, the fluidising gas escaping via the overflow pipes 9' and 15'.

I claim:

1. Valve for the selective distribution of fluidised material between at least two separate outlets, the valve being arranged to receive fluidisable material via a supply pipeline, the valve comprising a main compartment, a side wall and a bottom of the main compartment, a fluidising means which is located at the bottom of the main compartment and is capable of fluidising the said fluidisable material to an upper level, an overflow pipe which is provided in the side wall and is located at the upper level, at least one auxiliary compartment which is adjacent to the main compartment, said auxiliary compartment comprising a side wall, a bottom, and at least one communication passage which is between the main compartment and the auxiliary compartment through said respective side wall, a fluidising means which is located at the bottom of the respective auxiliary compartment and is capable of fluidising the said fluidisable material to a respective specific level, and an overflow pipe which is provided in the side wall of the respective auxiliary compartment and is located at a level which is at most equal to the level of the overflow pipe of the main compartment, said at least one communication passage being positioned at an intermediate level between the level of the highest fluidising means of the main compartment and the respective auxiliary compartment and the level of the overflow pipe of the respective auxiliary compartment.

2. Valve according to claim 1, wherein several of the auxiliary compartments are arranged round the main compartment and are each connected individually to the main compartment by a respective communication passage.

3. Valve according to claim 1 or claim 2, wherein the bottoms, together with fluidising means, of all the compartments are located in a common horizontal plane.

4. Valve according to claim 1, wherein the supply pipeline extends inside the main compartment and terminates in a lower end part which, in use, is submerged vertically in the fluidised material to a height which is sufficient to ensure pneumatic isolation between the supply pipeline and the overflow pipe of the main compartment.

5. Valve according to claim 1, wherein the main compartment is provided with several supply pipelines.

6. Valve according to claim 2, wherein the auxiliary compartments are joined to the main compartment by a respective common wall, and each communication passage is an aperture which is made in the respective common wall.

7. Valve according to claim 2, wherein the auxiliary compartments are positioned at a distance from the main compartment, and each communication passage comprises a sleeve which connects the respective apertures made in the respective walls of the main compartment and the respective auxiliary compartment.

8. Valve according to claim 1, wherein there is a single auxiliary compartment which is annular and surrounds the main compartment and which contains within its annular volume at least one bundle of tubes of a heat exchanger.

9. Valve according to claim 6, wherein the auxiliary compartment and the main compartment are arranged concentrically relative to the supply pipeline for the fluidisable material.

* * * * *